C. R. WATROUS.
Nut-Locks.

No. 149,362. Patented April 7, 1874.

Witnesses: Inventor:

UNITED STATES PATENT OFFICE.

CHARLES R. WATROUS, OF MYSTIC, CONNECTICUT.

IMPROVEMENT IN NUT-LOCKS.

Specification forming part of Letters Patent No. 149,362, dated April 7, 1874; application filed March 13, 1874.

*To all whom it may concern:*

Be it known that I, CHARLES R. WATROUS, of Mystic, New London county, Connecticut, have invented certain Improvements relating to Nut-Locks, of which the following is a specification:

Many plans have been proposed and operated with some success for securing nuts upon bolts. Such locking devices are more especially important in places where the nut is to be held fast in the desired position without being screwed tightly down; but it is of great importance, even with nuts which are screwed down as tightly as possible, if the structure is to be subjected to a jarring or tremulous motion. My invention is applicable alike to nuts which are to be left loose or to be screwed down tight. It may be used on machinery in general, bridges for railroad-trains, and others, and is especially applicable to the nuts which secure the fish-pieces on the joints of railroad-rails. I tap a small screw through the nut, and let the point enter a groove turned or otherwise produced on the face of the fish-piece, or other surface against which the nut bears. The small screw should, preferably, be hardened at the point, and be allowed to cut slightly into each side of the groove. It may serve, however, with some success if neither of these conditions obtain, so long as the small screw is by means of the groove allowed to take a very firm hold. The groove in the bearing-surface under the nut may, if preferred, be made in a washer which is placed under the nut, the washer being held against turning by any suitable means.

The following is a description of what I consider the best means of carrying out the invention.

The accompanying drawings form a part of this specification.

Figure 1:
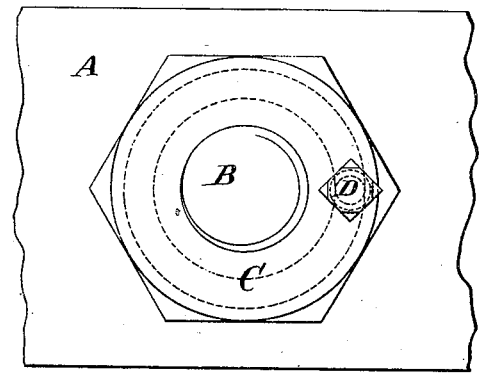
Figure 2:
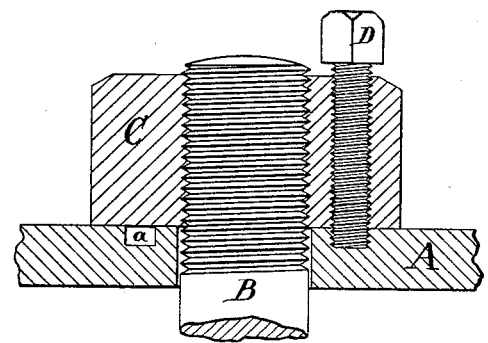

Figure 1 is a view in the line of the axis of the bolt, and Fig. 2 is a section in the plane of such axis.

Similar letters of reference indicate like parts in both the figures.

A is the fish-piece, or other bearing-surface, upon which the nut is to press. B is the bolt. C is the nut. D is a screw of considerably smaller diameter than the main bolt B. The screw D is of a length greater than the thickness of the nut C, and is tapped through the same in the position represented. A groove, *a*, of rectangular, or nearly rectangular, section is produced in the bearing-face of the part A, exactly concentric to the hole which receives the bolt B. The width of this groove *a* is a little less than the diameter of the exterior to the threads of the screw D. In applying the nut C, the screw D is not allowed to protrude beyond the bearing-face of the nut. Thus placed, it is of no effect, and the nut C is tightened by a wrench, or otherwise, in the ordinary manner. When set in the position which is desired it shall retain, either loosely or tightly pressing against the bearing-face of the part A, the same or a different wrench is applied upon the head of the screw D, and the latter is turned several times completely around. This screwing in of the screw D causes its point to protrude beyond the bearing-face of the nut C, and to enter the groove *a*. To produce the best effect, the screw D should be steel, or other very hard material, and in thus screwing it down, the threads of the screw should cut a little into both the outer and inner sides of the groove *a*. When the screw D has been thus forced in sufficiently, the nut C is securely locked. It is not essential that the screw D shall be turned sufficiently to cause its end to press fairly on the bottom of the groove *a*, though this may be generally desirable. Neither is it absolutely essential that the screw D shall always cut or take hold on both the inner and outer sides of the groove *a*. It will hold very firmly by thus taking into one side alone. By proper care, however, the groove *a* may be made in a position to exactly correspond with the position of the screw D, so that the latter will cut about equally into each side of the groove. Thus conditioned, there is no tendency to unscrew the screw D. Even if the latter is tapped quite loosely through the nut, it will retain its position very firmly. It will be observed that if from any cause the screw D should become loosened, it would require to shake backward several complete turns before it would be fairly out of the groove $a$, and cease to lock the nut.

I claim as my invention—

The groove $a$ in the bearing-surface A, in combination with the bolt B, nut C, and locking-screw D, adapted for joint operation, as herein specified.

In testimony whereof I have hereunto set my hand this 11th day of March, 1874, in the presence of two subscribing witnesses.

CHARLES R. WATROUS.

Witnesses:
  E. J. WILLIAMS,
  JOHN H. BURROWS.